(12) United States Patent
Yu

(10) Patent No.: US 8,404,796 B1
(45) Date of Patent: Mar. 26, 2013

(54) COMPOSITION FOR SEAMLESS INTERMEDIATE TRANSFER BELT

(75) Inventor: Robert C. U. Yu, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/442,204

(22) Filed: Apr. 9, 2012

(51) Int. Cl.
*C08G 63/02* (2006.01)
*C08G 64/00* (2006.01)

(52) U.S. Cl. ........................................ 528/196; 528/198
(58) Field of Classification Search .................. 528/196, 528/198
See application file for complete search history.

(56) References Cited

U.S. PATENT DOCUMENTS

| 6,044,243 A | 3/2000 | Hara |
| 6,101,360 A | 8/2000 | Hara |

FOREIGN PATENT DOCUMENTS

| JP | A 3-180309 | 8/1991 |
| JP | A 61-95361 | 7/1994 |
| JP | A 62-22514 | 8/1994 |

*Primary Examiner* — Terressa Boykin
(74) *Attorney, Agent, or Firm* — Pillsbury Winthrop Shaw Pittman LLP

(57) ABSTRACT

The presently disclosed embodiments relate generally to an image forming apparatus comprising a seamless intermediate transfer belt, and methods for making the same. The seamless intermediate transfer belt comprises a film forming A-B diblock copolymer. In other embodiment, the seamless intermediate transfer belt comprises the film forming A-B diblock copolymer and carbon black dispersion. The prepared seamless intermediate transfer belt of present disclosure provides increased mechanical strength to resist scratch/wear failure and early onset of fatigue-bend cracking development under normal dynamic intermediate transfer belt machine cycling conditions in the field, and thus extend the service life of the belt.

20 Claims, 3 Drawing Sheets

COMPOSITION FOR SEAMLESS INTERMEDIATE TRANSFER BELT

BACKGROUND

The presently disclosed embodiments relate generally to layers that are useful in imaging apparatus members and components, for use in electrophotographic, including digital printing, apparatuses. More particularly, the embodiments pertain to electrophotographic printing apparatus utilizing an improved toner image transfer member comprising a composition used to form an image transferring member component, namely, a single layered seamless intermediate transfer belt. The composition comprises a film forming polycarbonate which provides an intermediate transfer belt with numerous beneficial properties, such as, flexibility, high temperature stability, and superior mechanical strength which extends the service life of the intermediate transfer belt.

In electrophotography or electrophotographic printing, the charge retentive surface, typically known as a photoreceptor, is electrostatically charged, and then exposed to a light pattern of an original image to selectively discharge the surface in accordance therewith. The resulting pattern of charged and discharged areas on the photoreceptor form an electrostatic charge pattern, known as a latent image, conforming to the original image. The latent image is developed by contacting it with a finely divided electrostatically attractable powder known as toner. Toner is held on the image areas by the electrostatic charge on the photoreceptor surface. Thus, a toner image is produced in conformity with a light image of the original being reproduced or printed. The toner image formed on the photoreceptor surface may then be transferred to a receiving substrate or support member (e.g., paper) directly or first through the use of an intermediate transfer member, and the image affixed thereto to form a permanent record of the image to be reproduced or printed followed by transferring it to the receiving paper for fussing into copy printout. Subsequent to development, excess or residue toner left on the charge retentive surface is cleaned from the surface. The process is useful for light lens copying from an original or printing electronically generated or stored originals such as with a raster output scanner (ROS), where a charged surface may be imagewise discharged in a variety of ways.

The foregoing generally describes black and white electrophotographic printing machines. Electrophotographic printing can also produce color images by repeating the above process for each color of toner that is used to make the color image. For example, the photoreceptive surface may be exposed to a light image that represents a first color, say black. The resultant electrostatic latent image can then be developed with black toner particles to produce a black toner layer that is subsequently transferred onto a receiving substrate. The process can then be repeated or a second color, say yellow, then for a third color, say magenta, and finally for a fourth color, say cyan. When the toner layers are placed in superimposed registration the desired composite color toner image is formed and fused on the receiving substrate.

The color printing process described above superimposes the color toner layers directly onto a substrate. Other electrophotographic printing systems use intermediate transfer belts. In such systems successive toner layers are electrostatically transferred in superimposed registration from the photoreceptor onto an intermediate transfer belt. Only after the composite toner image is formed on the intermediate transfer belt is that image transferred and fused onto the substrate. Indeed, some electrophotographic printing systems use multiple intermediate transfer belts, transferring toner to and from belts as required to fulfill the requirements of the machine's overall architecture.

In operation, an intermediate transfer belt is brought into contact with a toner image-bearing member such as a photoreceptor belt. In the contact zone an electrostatic field generating device such as a corotron, a bias transfer roller, a bias blade, or the like creates electrostatic fields that transfer toner onto the intermediate transfer belt. Subsequently, the intermediate transfer belt is brought into contact with a receiver. A similar electrostatic field generating device then transfers toner from the intermediate transfer belt to the receiver. Depending on the system, a receiver can be another intermediate transfer member or a substrate onto which the toner will eventually be fixed. In either case the control of the electrostatic fields in and near the transfer zone is a significant factor in toner transfer.

Intermediate transfer belts often take the form of seamed belts fabricated by fastening two ends of a web material together, such as by welding, sewing, wiring, stapling, or gluing. Belts, sheets, films and the like are important to the xerographic process. Belt function is often significantly affected by the seam of the belt. For example, belts formed according to known butting or overlapping techniques provide a bump or other discontinuity in the belt surface leading to a height differential between adjacent portions of the belt, for example, of 0.010 inches or more depending on the belt thickness. This increased height differential leads to performance failure in many applications. When overlapping the opposite ends of a rectangular cut sheet and ultrasonically welded into a seamed intermediate transfer belt, the seam of the flexible intermediate transfer belt may occasionally contain undesirable high protrusions such as peaks, ridges, spikes, and mounds. These seam protrusions present problems during image cycling of the belt machine because they interact with cleaning blades to cause blade wear and tear, which ultimately affect cleaning blade efficiency and service life.

Another major disadvantage of having a seam in the flexible intermediate transfer belt is that the seam is a non imageable area due to physical/morphological discontinuity and electrical variation from the bulk of the belt, so it causes print defects in copy image printout.

To avoid the above problems, seamless intermediate transfer belts are preferred instead. In addition, the entire belt surface of the seamless intermediate transfer belt is imageable area without the complications caused by the seamed region of seamed belts. However, these seamless require manufacturing processes that are more involved and/or expensive than similar seamed intermediate transfer belts. This is particularly true when the intermediate transfer belt is long.

Due to the usage demands on the imaging member systems, the component parts are subject to significant wear which negatively impacts performance and service life. Thus, there is a constant need for improving such systems and parts, such as intermediate transfer belt in particular, to provide good performance and extended service life. In particular, there is a need for an efficient method of providing a seamless belt with improved properties and low cost.

Prior conventional intermediate transfer belts are disclosed in U.S. Pat. Nos. 6,101,360 and 6,044,243, which are hereby incorporated by reference in their entireties. The term "photoreceptor" or "photoconductor" is generally used interchangeably with the terms "imaging member." The term "electrophotographic" includes "electrophotographic" and "xerographic." The terms "charge transport molecule" are generally used interchangeably with the terms "hole transport molecule."

SUMMARY

According to aspects illustrated herein, there is provided a single layered seamless ITB belt prepared from a novel A-B diblock copolymer material. The belt provides both the benefit of surface continuity due to being seamless, so the entire belt surface is imageable, and low cost to manufacture due to being a single layer.

In the embodiments, there is provided a seamless intermediate transfer belt comprising a polycarbonate, wherein the polycarbonate is a high molecular weight film forming A-B diblock copolymer comprising a bisphenol A polycarbonate segment block (A) and a phthalic acid containing segment block (B) terminal capable of providing protection against amine species contaminants, selected from the group consisting of Formula (I) and Formula (II) below:

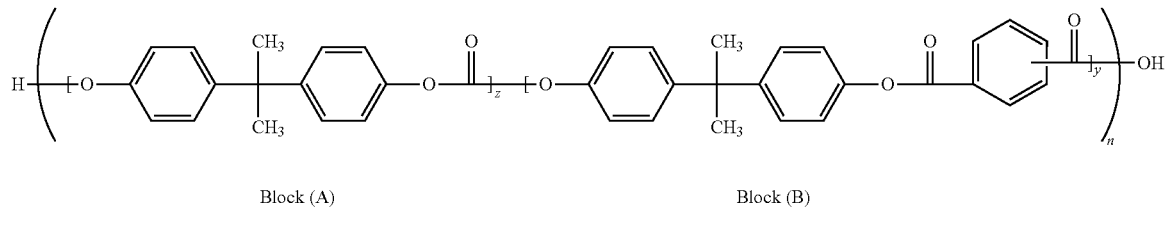

Formula (I)

Block (A)      Block (B)

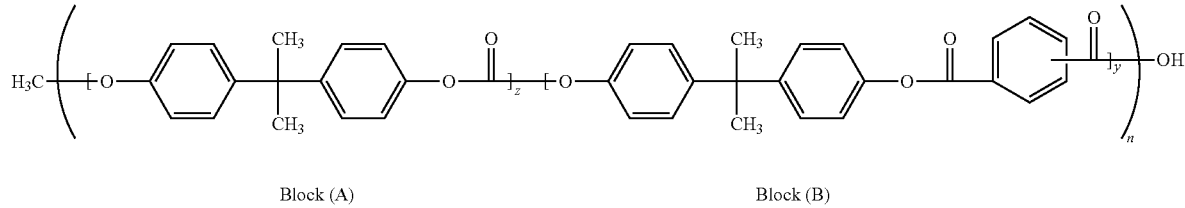

Formula (II)

Block (A)      Block (B)

wherein z represents the number of bisphenol A repeating units in block A of from about 9 to about 18, y is number of repeating phthalic acid block B of from about 1 to about 2, and n is the degree of polymerization between about 20 and about 90 for the copolymer having a weight average molecular weight between about 100,000 and about 250,000, and mixtures thereof.

In other embodiments, there is provided an image forming apparatus comprising: an imaging member for forming a toner image; and a seamless intermediate transfer belt for transferring the toner image formed on the imaging member to a receiving medium, wherein the seamless intermediate transfer belt comprises a dispersion of carbon black and a polycarbonate being a high molecular weight film forming A-B diblock copolymer comprising a bisphenol A polycarbonate segment block (A) and a phthalic acid containing segment block (B) terminal capable of providing protection against amine species contaminants, selected from the group consisting of Formula (I) and Formula (II) below:

Formula (I)

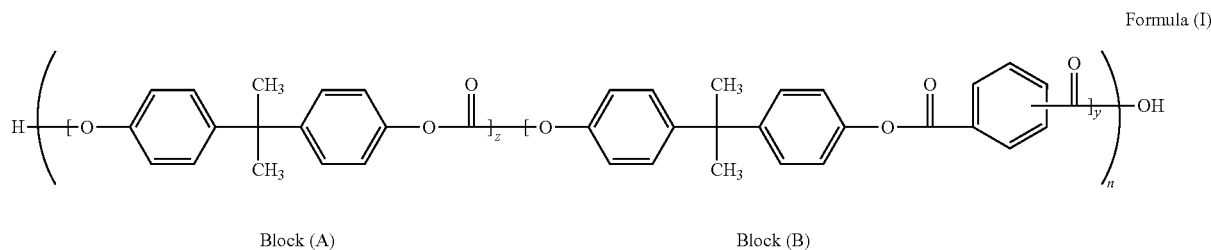

Block (A) Block (B)

Formula (II)

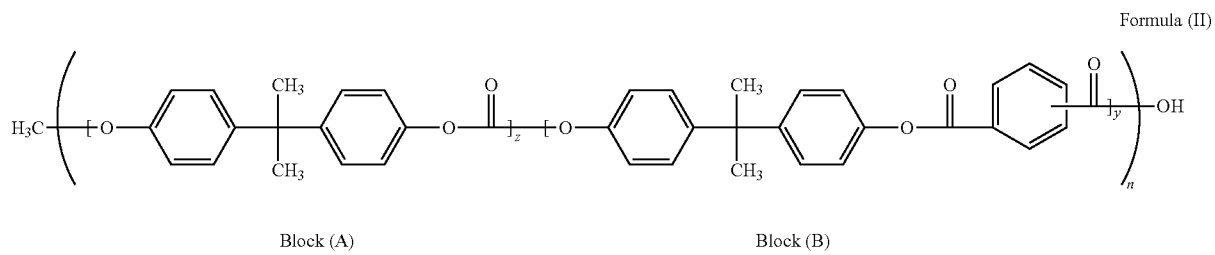

Block (A) Block (B)

wherein z represents the number of bisphenol A repeating units in block A of from about 9 to about 18, y is number of repeating phthalic acid block B of from about 1 to about 2, and n is the degree of polymerization between about 20 and about 90 for the copolymer having a weight average molecular weight between about 100,000 and about 250,000, and mixtures thereof.

In another embodiment, there is provided an image forming apparatus comprising: an imaging member for forming a toner image; and a seamless intermediate transfer belt for transferring the toner image formed on the imaging member to a receiving medium, wherein the seamless intermediate transfer belt comprises a high molecular weight film forming A-B diblock copolymer comprising a bisphenol A polycarbonate segment block (A) and a phthalic acid containing segment block (B) terminal capable of providing protection against amine species contaminants, selected from the group consisting of Formula (I) and Formula (II) below:

Formula (I)

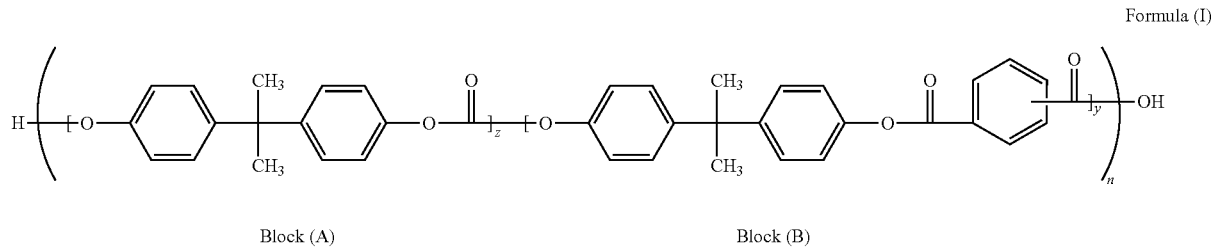

Block (A) Block (B)

Formula (II)

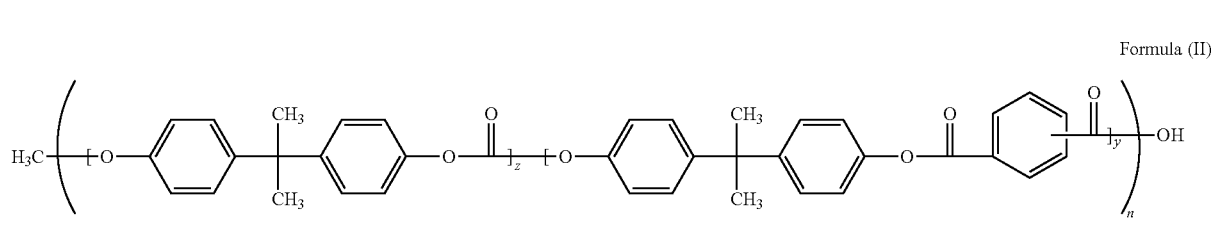

Block (A) Block (B)

wherein z represents the number of bisphenol A repeating units in block A of from about 9 to about 18, y is number of repeating phthalic acid block B of from about 1 to about 2, and n is the degree of polymerization between about 20 and about 90 for the copolymer having a weight average molecular weight between about 100,000 and about 250,000, and mixtures thereof.

In yet further embodiments, there is provided an image forming apparatus comprising: a first transfer apparatus for primarily transferring a toner image formed on an image bearing body (electrophotographic imaging member such as photoreceptor) onto a seamless intermediate transfer belt; and a second transfer apparatus for secondarily transferring the toner image transferred from the seamless intermediate transfer belt onto a receiving substrate (or paper) to give printout copy, wherein the seamless intermediate transfer belt comprises a dispersion of carbon black and a high molecular weight film forming A-B diblock copolymer comprising a bisphenol A polycarbonate segment block (A) and a phthalic acid containing segment block (B) terminal capable of providing protection against amine species contaminants, selected from the group consisting of Formula (I) and Formula (II) below:

FIG. 3 is a cross-sectional view of a seamless intermediate transfer belt according to the present embodiments.

DETAILED DESCRIPTION

In the following description, reference is made to the accompanying drawings, which form a part hereof and which illustrate several embodiments. It is understood that other embodiments may be used and structural and operational changes may be made without departure from the scope of the present disclosure.

To overcome the limitations associated with imaging member systems and component parts, as discussed above, the disclosed embodiments are directed generally to electrophotographic imaging printing apparatus utilizing an improved toner image transfer member, prepared to give a single layer which comprises a novel material formulation according to the description of present disclosure, for a seamless intermediate transfer belt. The novel formulation comprises a high molecular film forming A-B diblock copolymer to effect mechanical function improvement, good belt flexibility, fatigue bending induced cracking extension, as well as scratch/wear resistance; and, in some embodiments, the Formula (I)

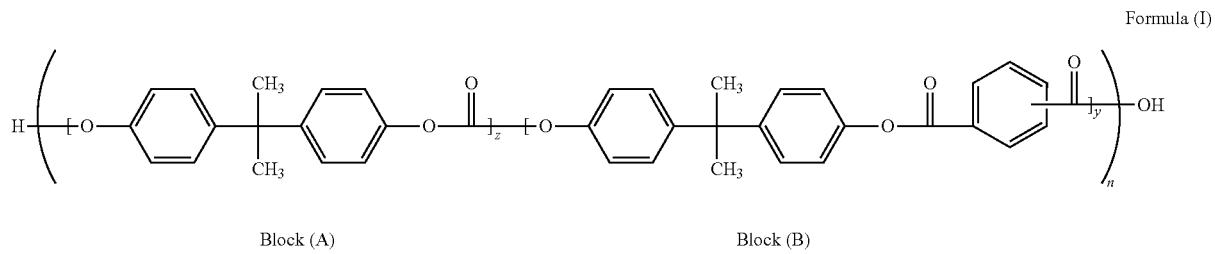

Block (A)        Block (B)

Formula (II)

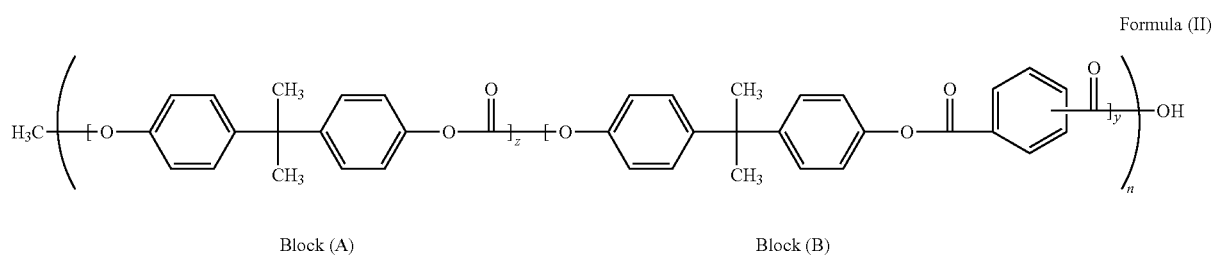

Block (A)        Block (B)

wherein z represents the number of bisphenol A repeating units in block A of from about 9 to about 18, y is number of repeating phthalic acid block B of from about 1 to about 2, and n is the degree of polymerization between about 20 and about 90 for the copolymer having a weight average molecular weight between about 100,000 and about 250,000, and mixtures thereof.

BRIEF DESCRIPTION OF THE DRAWINGS

For a better understanding, reference may be made to the accompanying figures.

Figure 1:
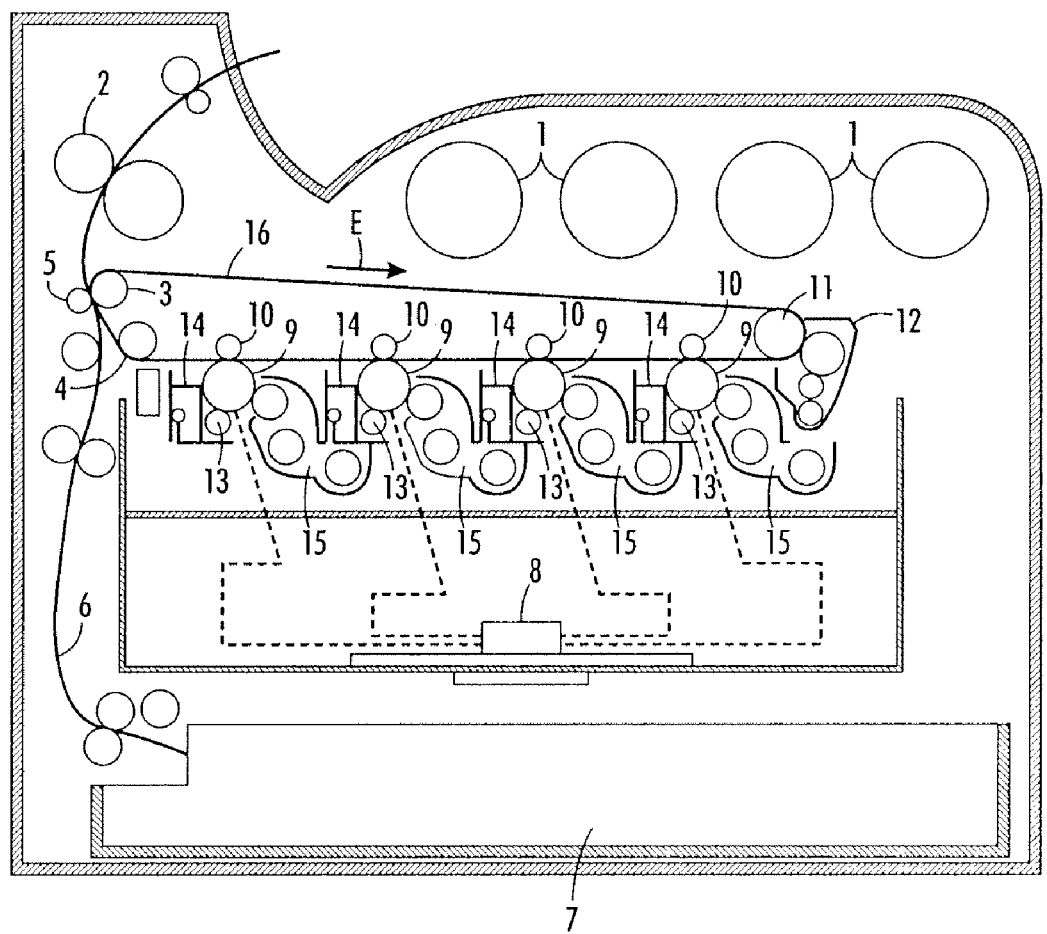
FIG. 1 is a schematic view showing one example of an image forming apparatus according to the present embodiments.

The exemplary embodiments of this disclosure are described below with reference to the drawings. The specific terms are used in the following description for clarity, selected for illustration in the drawings and not to define or limit the scope of the disclosure. The same reference numerals are used to identify the same structure in different figures unless specified otherwise. The structures in the figures are not drawn according to their relative proportions and the drawings should not be interpreted as limiting the disclosure in size, relative size, or location.

The image forming apparatus of the present embodiments is not particularly limited insofar as it belongs to an intermediate transfer body format, that is, an image forming apparatus having a structure provided with at least a first transfer means(/apparatus) for primarily transferring a toner image formed on an image bearing body onto an intermediate transfer belt, and a second transfer means(/apparatus) for secondarily transferring a toner image transferred on the intermediate transfer belt, onto a transfer body. Examples of the image forming apparatus of the present embodiments include a normal monocolor image forming apparatus in which only single color toners are accommodated in a developing device, a color image forming apparatus in which successive primary transfer of a toner image held on an image bearing body onto an intermediate transfer body is repeated, and a tandem-type color image forming apparatus in which a plurality of image bearing bodies provided with developing equipment for every color are arranged on an intermediate transfer body in series.

In addition, according to known methods, the image forming apparatus of the present embodiments may be optionally provided with an image bearing body, an electrification means for electrifying an image bearing body surface, an exposing means for exposing an image bearing body surface to the light to form an electrostatic latent image, a developing means for developing a latent image formed on an image bearing body surface using a developer to form a toner image, a means for fixing a toner image on a transfer body, a cleaning means for removing a toner and refuse attached to an image bearing body, and a discharging means for removing an electrostatic latent image remaining on an image bearing body surface, if necessary.

A specific embodiment of a tandem-type color image forming apparatus will be explained below using the drawings.

FIG. 1 is a schematic view showing one example of the image forming apparatus of the present embodiments. The image forming apparatus showed in FIG. 1 contains, as principal constituent members, four toner cartridges 1, one pair of fixing rolls 2, a back-up roll 3, a tension roll 4, a secondary transfer roll (secondary transfer means) 5, a paper path 6, a paper tray 7, a laser-generating device 8, four photoreceptors (image members) 9, four primary transfer rolls (primary transfer means) 10, a driving roll 11, a transfer cleaner 12, four electrification rolls 13, a photoreceptor cleaner 14, a developing device 15, and a seamless intermediate transfer belt 16. In the image forming apparatus shown in FIG. 1, a seamless intermediate transfer belt of the present embodiments is used as an intermediate transfer belt 16 which functions as a means for overlaying toner images, and a means for transferring a toner image.

Next, construction of an image forming apparatus as shown in FIG. 1 will be explained in stages. First, an electrification roll 13, a developing device 15, a primary transfer roll 10 disposed via an intermediate transfer belt 16, and a photoreceptor cleaner 14 are arranged counterclockwisely around a photoreceptor 9, and one set of these members form a developing unit corresponding to one color. In addition, each of these developing units is provided with a toner cartridge 1 for replenishing developer to each developing device 15, and a laser-generating device 8 which can irradiate laser light to a surface of the photoreceptor 9 between the electrifying roll 13 and the developing device 15 according to image information is provided relative to the photoreceptor 9 of each developing unit.

Four developing units corresponding to four colors (e.g. cyan, magenta, yellow, and black) are arranged in series in an approximately horizontal direction in an image forming apparatus, and an intermediate transfer belt 16 is provided so as to pass through a nip part between the photoreceptor 9 and the primary transfer roll 10 of each of the four developing units. The intermediate transfer belt 16 is stretched by a back-up roll 3, a tension roll 4, and a driving roll 11 which are provided in this order counterclockwisely on its inner circumferential side. Four primary transfer rolls are situated between the back-up roll 3 and the tension roll 4. A transfer cleaner 12 for cleaning an external circumferential surface of the intermediate transfer belt 16 is provided so as to contact with the driving roll 11 under pressure, via the intermediate transfer belt 16, on an opposite side of the driving roll 11.

In addition, a secondary transfer roll 5 for transferring a toner image formed on the external circumferential surface of the intermediate transfer belt 16 onto a surface of a recording paper conveyed from a paper tray 7 via a paper path 6 is provided so as to contact with the back-up roll 3 under pressure, on an opposite side of the back-up roll 3 via the intermediate transfer belt 16. On the external circumferential surface of the intermediate transfer belt 16 between the back-up roll 3 and the driving roll 11, a discharging roll (not shown) for discharging the external circumferential surface is provided.

In addition, a paper tray 7 for stocking recording paper is provided at the bottom of the image forming apparatus, and paper can be supplied so as to pass through a pressure-contacting part between the back-up roll 3 and the secondary transfer roll 5 constituting a secondary transfer portion from the paper tray 7 via a paper path 6. A recording paper which has passed through this pressure-contacting part can be conveyed by a conveying means (not shown) so as to pass through a pressure-contacting part of a pair of fixing rolls 2 and, finally, can be ejected outside of the image forming apparatus.

Next, an image forming method using the image forming apparatus of FIG. 1 will be explained. A toner image is formed at every developing unit, and the surfaces of the photoreceptors 9 rotating counter-clockwise are uniformly electrified with electrifying rolls 13, after which latent images are formed on the surfaces of the electrified photoreceptors 9 with a laser-generating device 8 (exposing device), and then the latent images are developed with a developer supplied from the developing devices 15 to form toner images, and the toner images brought to a pressure-contacting part between the primary transfer rolls 10 and the photoreceptors 9 are transferred onto the external circumferential surface of the intermediate transfer belt 16 rotating in the direction of arrow E. Toner and refuse adhered to the surface of the photoreceptors 9 after transfer of the toner images are cleaned with photoreceptor cleaners 14, ready for formation of the next toner image.

Toner images of each color developed at every developing unit are successively superimposed on the external circumferential surface of the intermediate transfer belt 16 so as to correspond to image information, and are delivered thus to the secondary transfer portion where they are transferred onto a surface of a recording (or receiving) paper conveyed from paper tray 7 via paper path 6, with the secondary transfer roll 5. A recording paper onto which a toner image has been transferred is further fixed by heating under pressure upon passing through a pressure-contacting part of the pair of fixing rolls 2 constituting a fixing portion and, after formation of an image on a recording medium surface, it is discharged outside the image forming apparatus.

An intermediate transfer belt 16 which has passed through a secondary transfer portion proceeds further in the direction of arrow E, the external circumferential surface thereof is electricity-removed with a discharging roll (not shown), and the external circumferential surface is cleaned with a transfer cleaner 12, ready for transfer of a next toner image.

Figure 2:
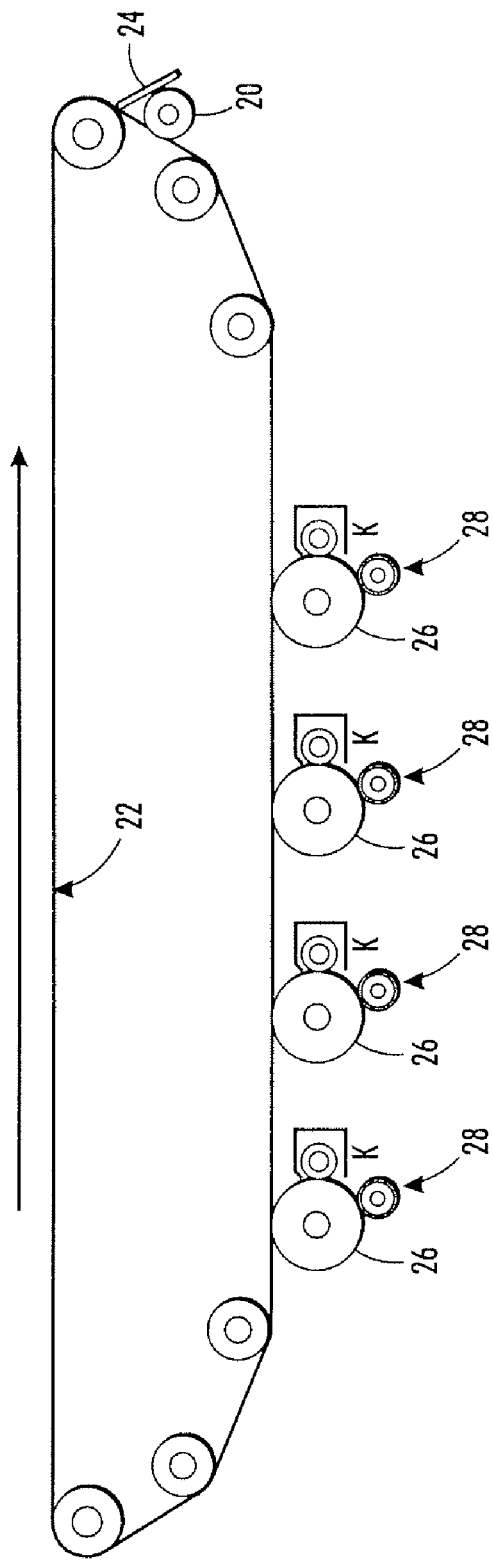
FIG. 2 is a schematic view showing a portion of an image forming apparatus according to the present embodiments; and seamless intermediate transfer belt does have carbon black particles dispersion included in its material matrix. The preparation of a seamless intermediate transfer belts, using the novel A-B diblock copolymer according to the disclosure of the present embodiments, not only has eliminated the common short comings and problems associated with the seam discontinuity of a seamed intermediate transfer belt, it is also being a more easily manufactured and low cost process than other seamless intermediate transfer belts. For example, the present formulation does not involve a cross-linking reaction at high temperature during curing and long processing time, which makes it more attractive to prepare than that of polyimide, the current mainline material used to fabricate seamless intermediate transfer belts. Polyimide requires a curing temperature of 350° C. and a cure time of many hours. The A-B diblock copolymers have very high molecular weight (Mw) and high Tg and can easily be solution cast over seamless stainless steel substrate belt (or drum) for drying at 145° C. in 30 minutes. Furthermore, the resulting dried coating layer of the A-B diblock copolymer belt (formed/encircled over the substrate belt) thus obtained is readily released or removed from the substrate belt to give a dimensional stable and thickness uniform seamless intermediate transfer belt. Other benefits of the present embodiments include desirable properties such as good electrical resistivity, good mechanical strength to resist scratch/wear failure, thermal stability, and extended dynamic fatigue cycling life over machine belt support module without premature onset of cracking development.

Shown in FIG. 2 is an exemplary embodiment of a portion of an image forming apparatus according to the present embodiments. As shown, a delivery member 20 is placed in contact with the seamless intermediate transfer belt 22 in the post-cleaning position after the intermediate transfer belt cleaning unit 24, such as a blade. The intermediate transfer belt cleaning unit is disposed in contact with the surface of the intermediate transfer belt for cleaning off residual toner and debris from the intermediate transfer belt. The single delivery member 20 can supply a release material or other similar material to the seamless intermediate transfer belt 22 which in turn delivers the same to the surface of each of the photoreceptors 26 to further help clean the transfer belt or reduce friction to the surface. In alternative embodiments, there can be provided a separate delivery member for each of the photoreceptors 26 in the CRU 28, rather than only the single delivery member 20.

Figure 3:
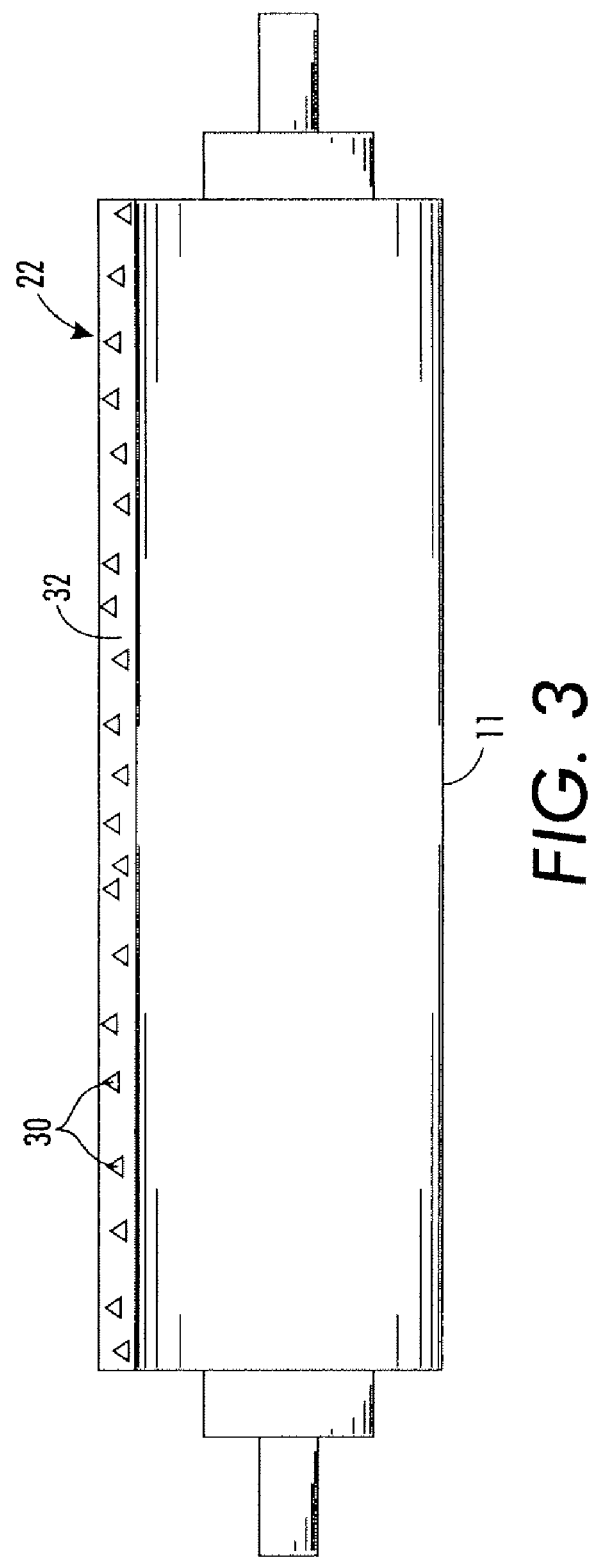

As shown in FIG. 3, there is provided a seamless intermediate transfer belt 22, made from the novel formulation comprising the A-B diblock copolymers 32 and conductive carbon black particles 30 dispersed therein to provide increased mechanical function which resists surface scratch/wear failure and pre-mature onset of fatigue-bend induced belt cracking under normal dynamic intermediate transfer belt machine cycling conditions in the field, and thus help reduce wear and extend service life of the belt. Other benefits of the seamless intermediate transfer belt include desirable properties such as good resisitivity (about $10^{11}$ ohms/sq at ambient and A Zone conditions), good mechanical strength, coeffient of thermal expansion (less than $6 \times 10^{-5}/°$ C.), and dynamic cycling life extension (1.8 Mcycles). The intermediate transfer belt is prepared by first dissolving the A-B diblock copolymer in a preferred organic solvent to formed a coating solution, then solution coated over the top surface of a flexible stainless steel substrate belt or rigid drum, and followed by subsequently dried at elevate temperature of at least 10° C. higher than the boiling point of the solvent. The resulting dried coating layer is released from the substrate to give a seamless intermediate transfer belt of this disclosure.

In a first embodiment, the intermediate transfer belt is single layer and comprises a polycarbonate which is a film forming A-B diblock copolymer. In particular, the polycarbonate is an A-B diblock copolymer comprising a bisphenol A polycarbonate segment block (A) and a phthalic acid containing segment block (B) terminal capable of providing protection against amine species contaminants, selected from the group consisting of Formula (I) and Formula (II) shown below:

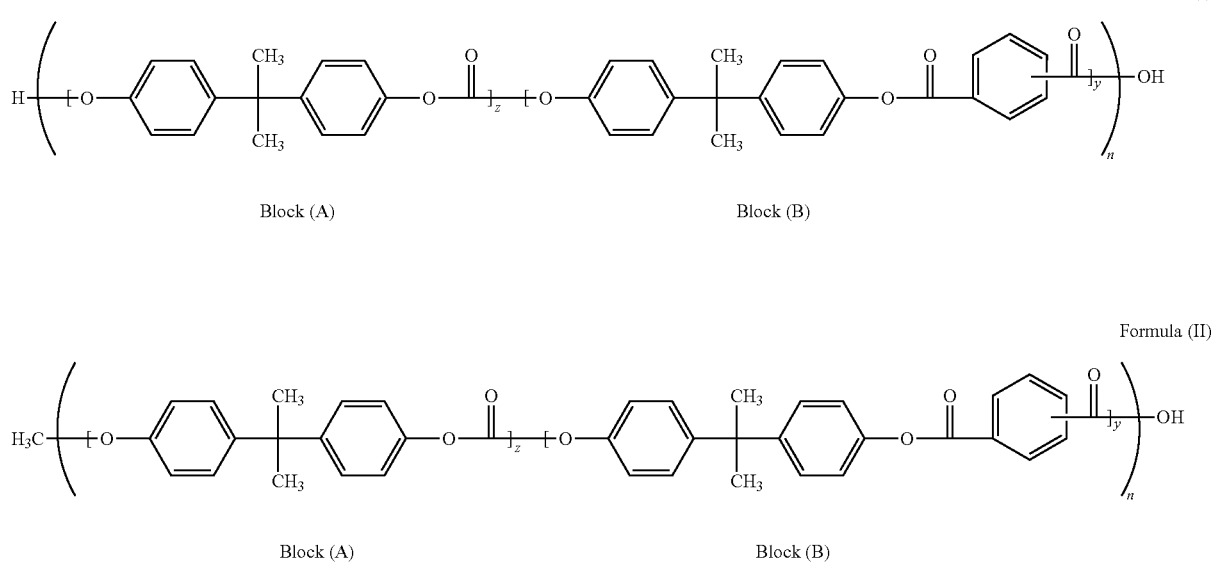

Formula (I)

Block (A)　　Block (B)

Formula (II)

Block (A)　　Block (B)

wherein z represents the number of bisphenol A repeating units in block A of from about 9 to about 18, y is number of repeating phthalic acid block B of from about 1 to about 2, and n is the degree of polymerization between about 20 and about 90 for the copolymer having a weight average molecular weight between about 100,000 and about 250,000, or from about 40 to about 70, in which the copolymer may have a weight average molecular weight between about 130,000 and about 200,000, and mixtures thereof. The phthalic acid in segment block (B) of the A-B diblock copolymer may either be a terephthalic acid or isophthalic acid represented respectively by the following structures:

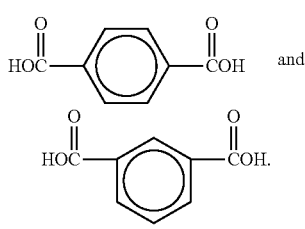

and

The specific A-B diblock copolymer chosen to meet the present polymer blend formulation requirement is LEXAN HLX polymer available from Sabic Innovative Plastics (Pittsfield, Mass.). The LEXAN HLX (as described in the above Formulas (I) and (II)) is a bisphenol A polycarbonate/phthalic acid film forming copolymer. The novel film forming A-B diblock copolymer, being a polycarbonate, is derived/modified from bisphenol A polycarbonate structure by the inclusion of small fraction of phthalic acid into the polymer backbone such that the resulting copolymer contains about 90 mole percent of a bisphenol A segment block (A) linearly linking to about 10 mole percent of a segmental block (B) of phthalic acid terminal in the A-B diblock copolymer chain. The copolymer as obtained has an average weight molecular of about 175,000.

In a second embodiment, the film forming A-B diblock copolymer used comprises the same bisphenol A polycarbonate poly(4,4'-isopropylidene diphenyl carbonate) block (A) and a phthalic acid containing terminal segmental block (B), but with the difference that the end terminal of the bisphenol A polycarbonate segment block (A) is terminated with a methy, —CH$_3$, group. Thus, in this A-B diblock copolymer, the molecular structure becomes Formula (II), with z, y and n being the same as defined in the above Formula (I):

Formula A-1
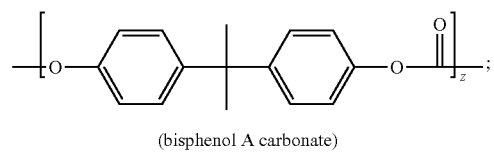
(bisphenol A carbonate)

Formula A-2
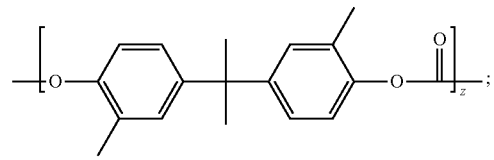

Formula A-3
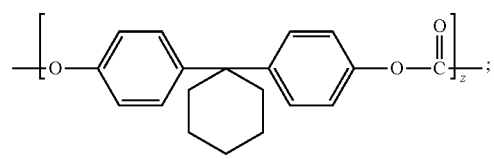

Formula A-4
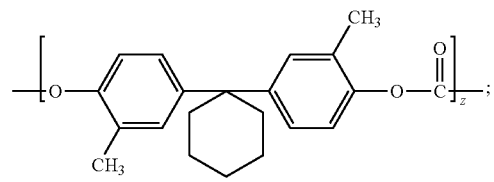

Formula (II)
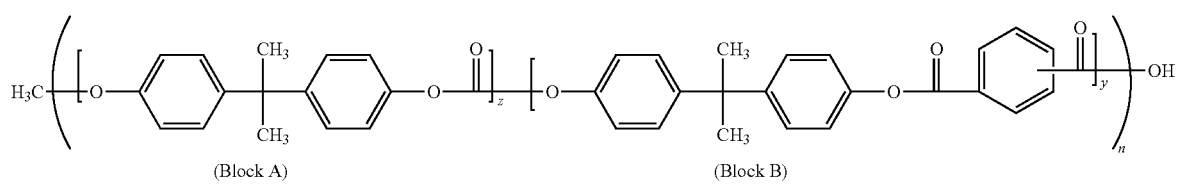

In these embodiments, the intermediate transfer belt of the imaging members is formulated and prepared according to the material formulation and process of the present disclosure. The seamless intermediate transfer belt of the present embodiments has demonstrated to be very mechanically robust which provides surface scratch/wear resistance and prevents early onset of dynamic fatigued bend belt cracking development as well to achieve its functional life extension.

In a third embodiment, the intermediate transfer belt of present disclosure may further be formulated in the same manners described in all the preceding embodiments, except that they are prepared to comprise of variants of film forming thermoplastic materials derived by replacement of the bisphenol A polycarbonate segmental block (A) of the A-B diblock copolymer of Formulas (I) and (II) by alternate polycarbonate. The exemplary block (A) alternate polycarbonates in the A-B diblock copolymer variants are the following:

-continued

Formula A-5
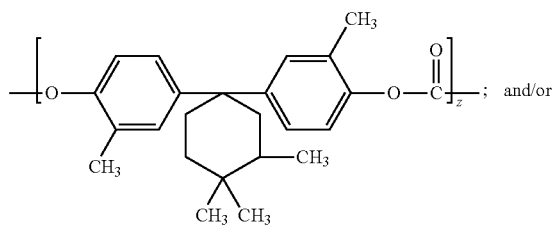
; and/or

-continued

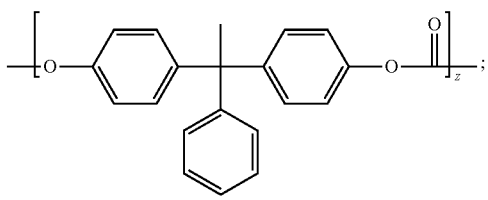

Formula A-6

In a fourth embodiment, the film forming copolymer used for intermediate transfer belt preparation is yet another variant derived by modifying or replacing the phthalic acid segmental block (B) of the A-B diblock copolymer of Formulas (I) and (II) by an alternate organic acid. Therefore, the acid terminal segmental block (B) in the copolymer variants have one of the following structures:

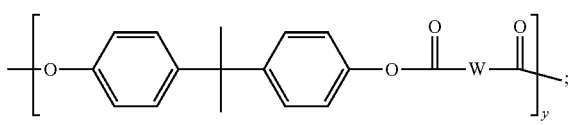

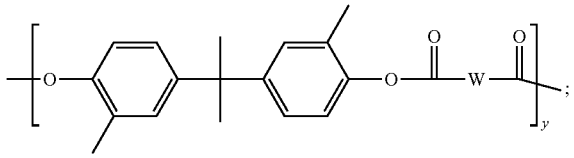

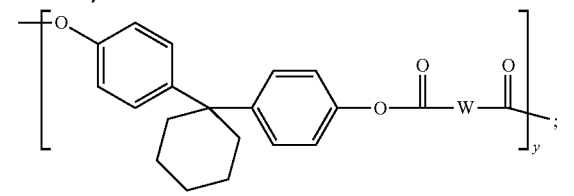

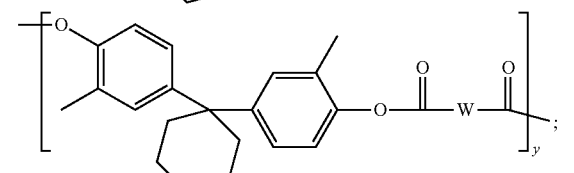

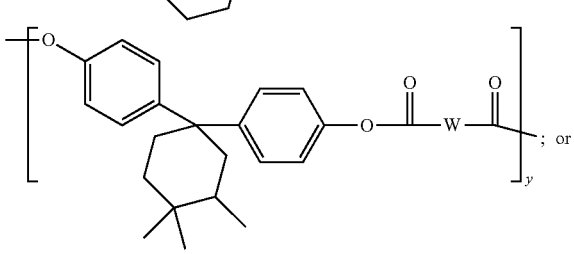

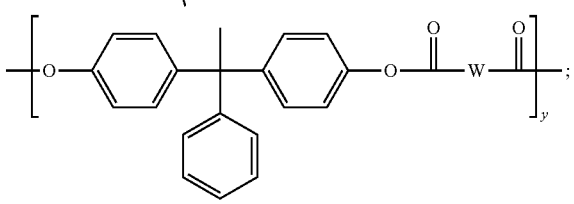

wherein the W in the segment block (B) is an aromatic moiety or an aliphatic moiety of dicarboxylic acid derived from such as a phthalic acid, an terephthalic acid, an isophthalic acid, or derived from an aliphatic acid such as an glutaric acid, adipic acid, heptanedioic acid, octanedioic acid, azelaic acid, decanedioic acid, and the like as shown below derived from an aliphatic acid such as an glutaric acid, adipic acid, heptanedioic acid, octanedioic acid, azelaic acid, decanedioic acid, and the like as listed below:

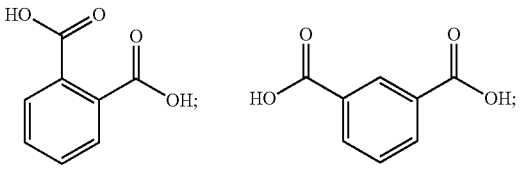

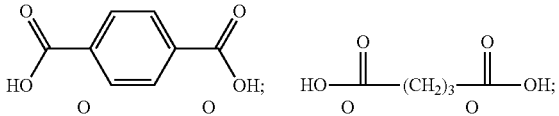

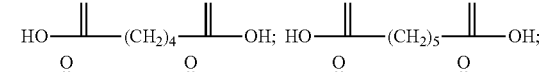

In the above embodiments, y is from about 1 to about 2.

In a fifth embodiment, the film forming copolymer used for intermediate transfer belt preparation is yet another extended variant derived by modification or replacement of both segmental block (A) and block (B) of the A-B diblock copolymer of Formulas (I) and (II). Therefore, the resulting A-B diblock copolymers comprise of the combinations of all the preceding alternate polycarbonate block (A) and alternate organic acids block (B) in its copolymer back bone.

In a sixth embodiment, the seamless intermediate transfer belts prepared according to the descriptions of all the above embodiments of this disclosure are also included with carbon black dispersion in each material matrix to render the desired electrical conductivity. The carbon black dispersion is present in the intermediate transfer belt in an amount of from about 5.0 to about 15.0 percent (corresponds to about 95 and about 85 percent of diblock copolymer), or from about 9.0 to about 12.0 percent (corresponds to about 91 and about 88 percent of diblock copolymer) by weight based on the total weight of the resulting intermediate transfer belt. In the preferred embodiments, the carbon black is included into the intermediate transfer belt by preparing and adding a carbon black dispersion into a solution prepared by dissolving the A-B diblock copolymer in a preferred organic solvent, then solution coating it over top surface of a flexible stainless steel substrate, and followed by subsequently dried at elevate temperature to give a flexible intermediate transfer belt of this disclosure. The intermediate transfer belt as obtained according to this disclosure has a resistivity of between $1.0 \times 10^9$ ohms/sq. and $1.0 \times 10^{13}$ ohms/sq.; or between $1.0 \times 10^{10}$ ohms/sq. and $1.0 \times 10^{12}$ ohms/sq.; or $1.0 \times 10^{11}$ ohms/sq. and $5.0 \times 10^{11}$ ohms/sq. In these embodiments, the intermediate transfer belt prepared according to the material formulation and process has a thickness of from about 50 microns to about 150 microns, or from about 70 microns to about 90 microns when dried. In a specific embodiment, the dried intermediate transfer belt is 85 microns.

The intermediate transfer belt may be formed in a number of ways. In such embodiments, a long sheet of material for the belt is made from the formulation as described above. After cutting the sheet to a specified length, the two opposite ends of the cut sheet are joined by any conventionally known method. Alternatively, for example, the intermediate transfer belt may be formed by ultrasonically welding the opposite ends of the cut sheet to give a seamed belt. Otherwise, the two opposite ends of the cut sheet may be bonded by butt-joints through soluble solvent fusion to give a seamless intermediate belt of present disclosure. A butt-joint is a joint formed by two surfaces that meet without overlap or complex intersection.

Other methods include forming the belt material on a tubular core, in which the seamless belt formulation is developed on the inner and outer circumference of the tubular core into a tubular form by coating according to the immersion method, heating and centrifugal forming method or applying method, and the developed layer is dried and formed into a film, as disclosed in, for example, JP-A No. 61-95361, JP-A No. 62-22514, and JP-A No. 3-180309, which are incorporated herein by reference in their entireties.

However, for the seamless intermediate transfer belt of this disclosure, the present embodiments are prepared by first dissolving the A-B diblock copolymer in a preferred organic solvent to formed a coating solution, then solution coated over the top surface of a flexible stainless steel substrate belt or rigid drum, and followed by drying at an elevated temperature of at least 10° C. higher than the boiling point of the solvent. The resulting dried coating layer is released from the substrate to give a seamless intermediate transfer belt of this disclosure.

Various exemplary embodiments encompassed herein include a method of imaging which includes generating an electrostatic latent image on an imaging member, developing a latent image, and transferring the developed electrostatic image to a suitable substrate.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The example set forth herein below and is illustrative of different compositions and conditions that can be used in practicing the present embodiments. All proportions are by weight unless otherwise indicated. It will be apparent, however, that the embodiments can be practiced with many types of compositions and can have many different uses in accordance with the disclosure above and as pointed out hereinafter.

Example 1

Master Solution

A 17.5% wt LEXAN HLX solution was prepared by dissolving a measured 35 grams of LEXAN HLX copolymer in 165 grams dimethylformamide (DMF) to give a LEXAN HLX master solution. The mixture was rolled-mill overnight (or for at least 12 hours) and then submersed in 85° C. hot water bath to completely dissolve the copolymer. A clear master solution resulted.

Mill-Base Solution

A 12% wt LEXAN HLX solution was likewise prepared by dissolving a measured 12 grams of LEXAN HLX copolymer in 88 grams DMF, rolled-mill overnight to dissolve the copolymer and kept in 85° C. hot water bath to dissolve the copolymer. A predetermined amount of carbon black (Special Black 4 from Evonik Industries (Essen, Germany)) was then directly added into the 12% LEXAN HLX solution and attritor milled with 1 mm diameter stainless steel beads for 6 hours to give a 10% weight carbon black dispersion mill-base solution. The final dispersion mill-base solution has a 22% wt solid content.

Example 2A

Intermediate Transfer Belt Coating Solution

The prepared 21.5% wt mill-base solution was then mixed with the 17.5% wt LEXAN HLX master solution as 1 part (21.5% wt mill-base) with 4 parts (17.5% wt LEXAN HLX master solution) and plus the addition of small amount of Stepfac release agent (available from Stepan Company (Northfield, Ill.)) at 0.35% wt and small amount of fluoro compound surface leveling agent (Novec FC4432 from 3M Corporation (St. Paul, Minn.)) at 0.01% wt. The mixture was again rolled-mill overnight (or at least 12 hours) to give a resulting intermediate transfer belt coating solution.

Example 2B

LEXAN HLX Coating Solution Preparation

To assess the mechanical integrity and strength of the copolymer for valid ITB application, an additional 17.5% wt LEXAN HLX A-B diblock copolymer coating solution was also prepared by dissolving the copolymer in DMF solvent by following the same procedures described in the master solution preparation of Example 1, except that 1.1% wt of Stepfac release agent (with respect only to the weight of LEXAN HLX copolymer) was included in the coating solution.

Example 3

Intermediate Transfer Sheet Preparation

The resulting intermediate transfer belt coating solution of Example 2A (having 15.4% wt HLX copolymer, 2.2% wt carbon black dispersion, and 0.01% wt FC4432) as obtained from that described above was hand coated, with a 40 mil bar gap, over a rigid stainless steel substrate sheet and dried at 140° C. for one hours to give a final 85-micron thick dried intermediate transfer sheet easily released from the stainless steel sheet. The intermediate transfer sheet/layer comprising Lexan HLX and carbon black dispersion as obtained had a resistivity of about $1.08 \times 10^{11}$ ohms/sq. at room ambient and about $1.02 \times 10^{11}$ ohms/sq. under 90% relative humidity/90° F. condition.

LEXAN HLX Sheet Preparation

The 17.5% wt LEXAN HLX A-B diblock copolymer coating solution of Example 2B as prepared above and likewise solution cast over a flexible stainless steel substrate sheet and dried at 140° C. for one hours to give a resulting 85-micron thick dried LEXAN HLX sheet that was easily released from the stainless steel substrate belt.

Mechanical Property Determination

Both the intermediate transfer sheet and the LEXAN HLX sheet obtained according to the preceding descriptions were determined for their Young's Modulus and break strength. The results thus obtained are listed in Table 1 below:

TABLE 1

| Layer Sample | Molecular Weight | Young's Modulus (Mpa/PSI) | Break Strength (Mpa/PSI) |
| --- | --- | --- | --- |
| LEXAN HLX | 175,000 | 2,579/373,955 | 66/9,570 |
| ITB Layer | Same | 2,937/425,865 | 70/10,150 |

Example 4

Intermediate Transfer Belt Preparation

A seamless intermediate transfer belt of this disclosure was prepared by applying the intermediate transfer belt coating solution of Example 2A over the top surface of a flexible stainless steel substrate belt and followed by subsequent drying at an elevated temperature of 140° C. for 30 minutes. The resulting dried coating layer was released from the substrate belt to give a seamless intermediate transfer belt of this disclosure.

In summary, the present embodiments describe a seamless intermediate transfer belt that exhibits desirable electrical conductivity and mechanical property, including increased wear resistance, and methods for making the same. The novel intermediate transfer belt comprises a film forming A-B diblock copolymer, and in embodiments, carbon black dispersion, which provides the belt with superior mechanical strength and good electrical conductivity.

All the patents and applications referred to herein are hereby specifically, and totally incorporated herein by reference in their entirety in the instant specification.

It will be appreciated that several of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A seamless intermediate transfer belt comprising a polycarbonate, wherein the polycarbonate is an A-B diblock copolymer comprising a bisphenol A polycarbonate segment block (A) and a phthalic acid containing segment block (B) terminal capable of providing protection against amine species contaminants, selected from the group consisting of Formula (I) and Formula (II) below:

Formula (I)

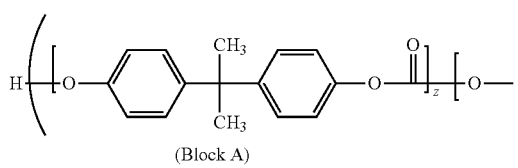

(Block A)

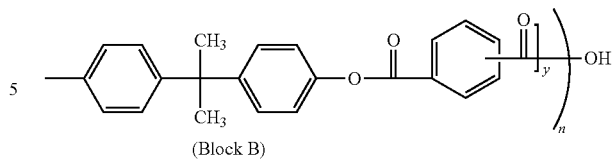

(Block B)

Formula (II)

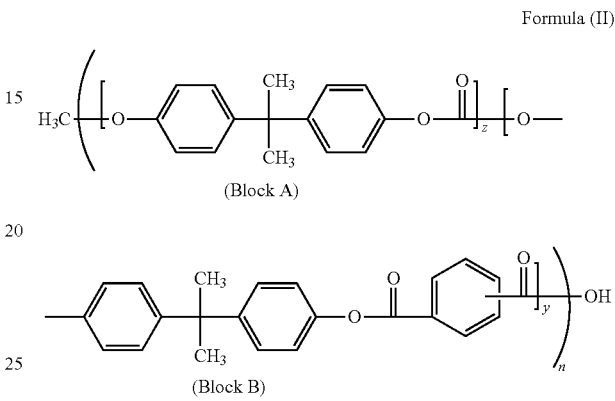

wherein z represents the number of bisphenol A repeating units in block A of from about 9 to about 18, y is number of repeating phthalic acid block B of from about 1 to about 2, and n is the degree of polymerization between about 20 and about 90 for the copolymer having a weight average molecular weight between about 100,000 and about 250,000, and mixtures thereof.

2. The seamless intermediate transfer belt of claim 1 further comprising a carbon black dispersion.

3. The seamless intermediate transfer belt of claim 2, wherein the carbon black dispersion is present in an amount of from about 5.0 to about 15.0 percent by weight of the total weight of the seamless intermediate transfer belt.

4. The seamless intermediate transfer belt of claim 3, wherein the carbon black dispersion is present in an amount of from about 9.0 to about 12 percent by weight of the total weight of the seamless intermediate transfer belt.

5. The seamless intermediate transfer belt of claim 2, wherein the A-B diblock copolymer is present in an amount of from about 95 to about 85 percent by weight of the total weight of the seamless intermediate transfer belt.

6. The seamless intermediate transfer belt of claim 5, wherein the A-B diblock copolymer is present in an amount of from about 91 to about 88 percent by weight of the total weight of the seamless intermediate transfer belt.

7. The seamless intermediate transfer belt of claim 1, wherein the degree n of polymerization of the A-B diblock copolymer is from about 40 to about 70.

8. The seamless intermediate transfer belt of claim 1, wherein a weight average molecular weight of the A-B diblock copolymer is from about 130,000 to about 200,000.

9. The seamless intermediate transfer belt of claim 1, wherein the bisphenol A segmental block (A) of the A-B diblock copolymer of Formulas (I) and (II) are replaced by one of the following alternate polycarbonates:

Formula A-1

[chemical structure]

Formula A-2

[chemical structure]

Formula A-3

[chemical structure]

Formula A-4

[chemical structure]

Formula A-5

[chemical structure]; and/or

Formula A-6

[chemical structure].

10. The seamless intermediate transfer belt of claim 1, wherein the phthalic acid segmental block (B) of the A-B diblock copolymer of Formulas (I) and (II) are replaced by an alternate organic acids selected from the group consisting of:

[chemical structure];

[chemical structure];

-continued

[chemical structure];

[chemical structure];

[chemical structure];

and

[chemical structure];

wherein W is an aromatic moiety or an aliphatic moiety of dicarboxylic acid derived from a phthalic acid, a terephthalic acid, or an isophthalic acid, or an aliphatic acid, and y is from about 1 to about 2.

11. The seamless intermediate transfer belt of claim 1, wherein the bisphenol A segmental block (A) and phthalic acid segmental block (B) of the A-B diblock copolymer of Formulas (I) and (II) are both replaced by an alternate polycarbonate and an alternate organic acid, respectively, the alternate polycarbonate segmental block (A) being one selected from the group consisting of:

Formula A-1

[chemical structure];

(bisphenol A carbonate)

Formula A-2

[chemical structure];

Formula A-3

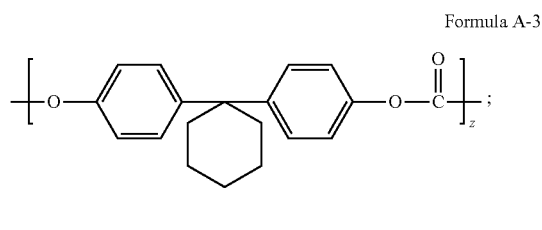

Formula A-4

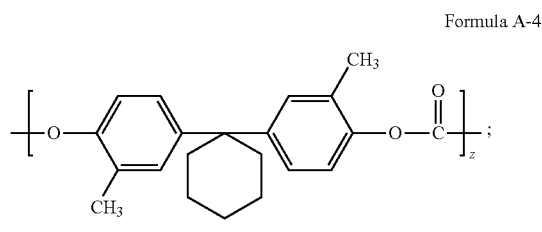

Formula A-5

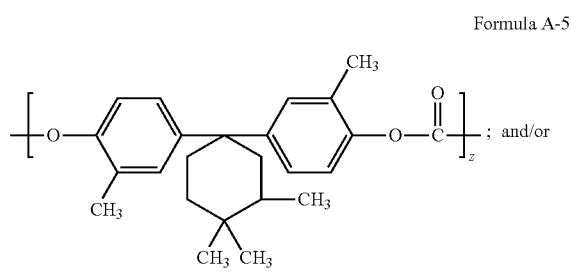; and/or

Formula A-6

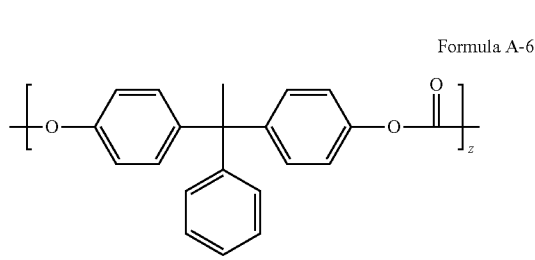

and the alternate organic acid segmental block (B) being one selected from the group cosisting of:

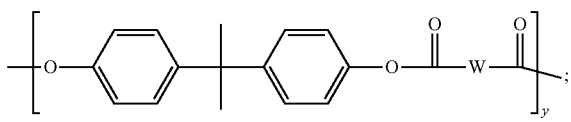;

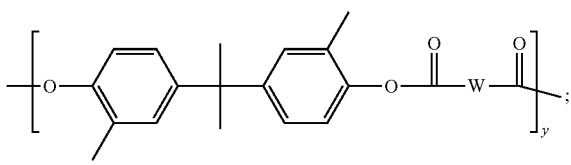;

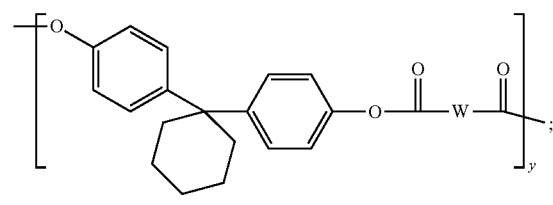;

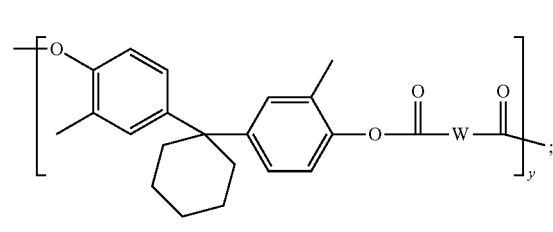;

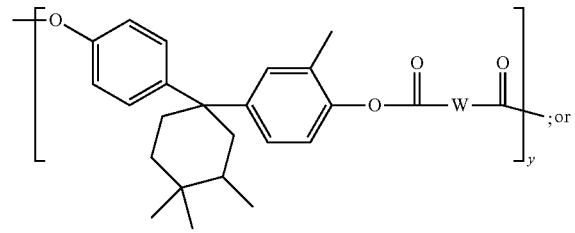;or

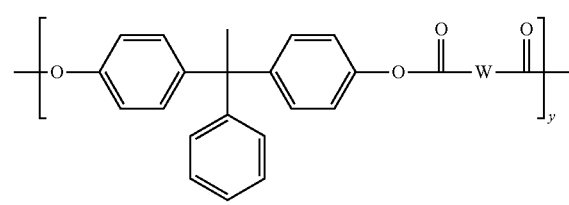

wherein W is an aromatic moiety or an aliphatic moiety of dicarboxylic acid derived from a phthalic acid, a terephthalic acid, or an isophthalic acid, or an aliphatic acid, and y is from about 1 to about 2.

12. The seamless intermediate transfer belt of claim 1 having a thickness of from about 50 to about 150 microns.

13. The seamless intermediate transfer belt of claim 1 having an electrical resistivity of between $1.0 \times 10^9$ ohms/sq. and $1.0 \times 10^{13}$ ohms/sq.

14. An image forming apparatus comprising:
an imaging member for forming a toner image; and
a seamless intermediate transfer belt for transferring the toner image formed on the imaging member to a receiving medium, wherein the seamless intermediate transfer belt comprises a dispersion of carbon black and an A-B diblock copolymer comprising a bisphenol A polycarbonate segment block (A) and a phthalic acid containing segment block (B) terminal capable of providing protection against amine species contaminants, selected from the group consisting of Formula (I) and Formula (II) below:

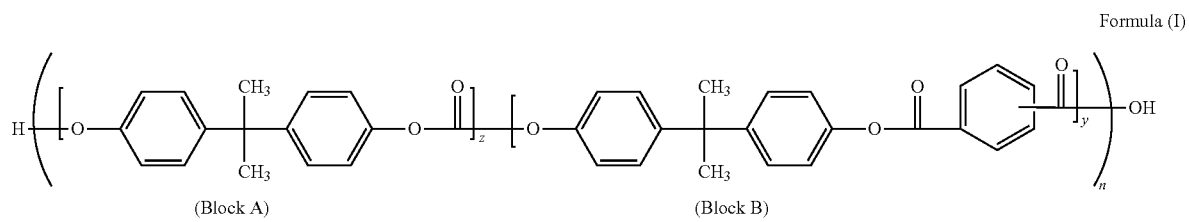

Formula (I)

(Block A) (Block B)

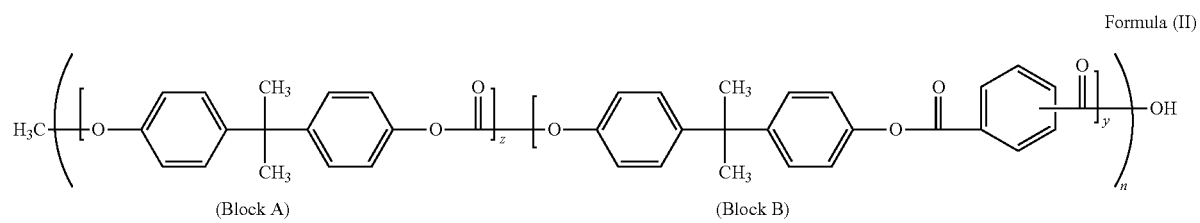

Formula (II)

(Block A) (Block B)

wherein z represents the number of bisphenol A repeating units in block A of from about 9 to about 18, y is number of repeating phthalic acid block B of from about 1 to about 2, and n is the degree of polymerization between about 20 and about 90 for the copolymer having a weight average molecular weight between about 100,000 and about 250,000, and mixtures thereof.

15. The image forming apparatus of claim 14, wherein the seamless intermediate transfer belt further comprises carbon black in an amount of from about 5.0 to about 15.0 percent by weight of the total weight of the seamless intermediate transfer belt.

16. An image forming apparatus comprising:

an imaging member for forming a toner image; and a seamless intermediate transfer belt for transferring the toner image formed on the imaging member to a receiving medium, wherein the seamless intermediate transfer belt comprises an A-B diblock copolymer comprising a bisphenol A polycarbonate segment block (A) and a phthalic acid containing segment block (B) terminal capable of providing protection against amine species contaminants, selected from the group consisting of Formula (I) and Formula (II) below:

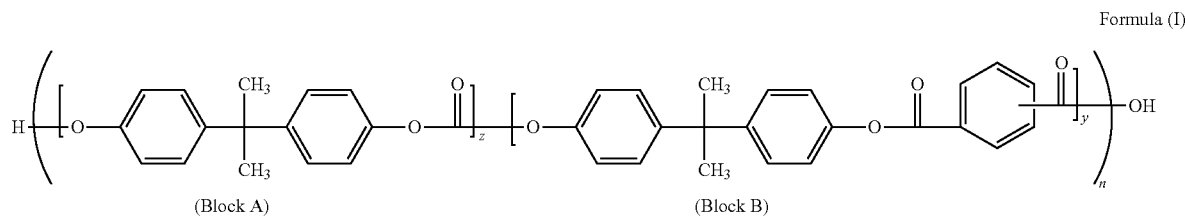

Formula (I)

(Block A) (Block B)

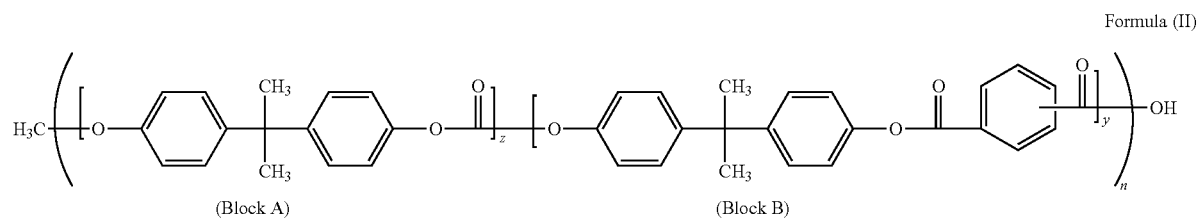

Formula (II)

(Block A) (Block B)

wherein z represents the number of bisphenol A repeating units in block A of from about 9 to about 18, y is number of repeating phthalic acid block B of from about 1 to about 2, and n is the degree of polymerization between about 20 and about 90 for the copolymer having a weight average molecular weight between about 100,000 and about 250,000, and mixtures thereof.

17. The image forming apparatus of claim 16, wherein the seamless intermediate transfer belt is prepared by applying an intermediate transfer belt coating solution over a flexible stainless steel substrate belt or rigid drum and dried at an elevated temperature of at least 10° C. higher than a boiling point of a solvent in the coating solution.

18. The image forming apparatus of claim 16, wherein the seamless intermediate transfer belt is prepared by applying an intermediate transfer belt coating solution over a stainless steel substrate, dried at an elevated temperature of at least 10° C. higher than a boiling point of a solvent in the coating solution to produce a sheet, and bonding two opposite ends of the sheet by butt-joints through solvent fusion to give a seamless intermediate belt.

19. The image forming apparatus of claim 16, wherein the seamless intermediate transfer belt comprises a carbon black dispersion that is present in an amount of from about 9.0 to about 12 percent by weight of the total weight of the seamless intermediate transfer belt.

20. The image forming apparatus of claim 16, wherein the A-B diblock copolymer is present in an amount of from about 95 to about 85 percent by weight of the total weight of the seamless intermediate transfer belt.

* * * * *